United States Patent [19]

Sirkin et al.

[11] Patent Number: 5,570,141

[45] Date of Patent: Oct. 29, 1996

[54] MOLDED FRAME FOR FIXING OPTICAL ELEMENTS IN A LIQUID CRYSTAL SHUTTER

[75] Inventors: Eric R. Sirkin, Palo Alto; Joseph J. Curry, Los Altos, both of Calif.

[73] Assignee: Apple Computer, Inc., Cupertino, Calif.

[21] Appl. No.: 876,675

[22] Filed: Apr. 30, 1992

[51] Int. Cl.⁶ ...................................................... H04N 5/72
[52] U.S. Cl. ........................... 348/832; 348/825; 348/835
[58] Field of Search ..................................... 358/245, 247, 358/248, 249, 250, 252, 253, 255; 313/477 R, 478, 482, 474; 348/818, 824, 825, 833, 834

[56] References Cited

U.S. PATENT DOCUMENTS 3,518,373  6/1970  Cushera et al. ......................... 348/834
4,485,329  11/1984  Donofrio et al. ........................ 358/247
4,834,330  5/1989  Swillinger ............................... 348/834

FOREIGN PATENT DOCUMENTS 2115656  9/1983  United Kingdom ................... 358/250

Primary Examiner—Edward L. Coles, Sr.
Assistant Examiner—Thomas D. Lee
Attorney, Agent, or Firm—Blakely, Sokoloff, Taylor & Zafman

[57] ABSTRACT

A molded frame for fixing optical elements in a liquid crystal shutter including a registration portion configured similar to a 35 mm slide frame for precisely registering the elements relative to one another and a mounting portion configured to mate with the outer surface of a CRT and couple the frame thereto.

21 Claims, 4 Drawing Sheets

MOLDED FRAME FOR FIXING OPTICAL ELEMENTS IN A LIQUID CRYSTAL SHUTTER

BACKGROUND OF THE INVENTION

1. Field of the Invention

The present invention relates generally to optical systems, and more particularly to an apparatus and method for bonding and fixing optical elements in a liquid crystal shutter.

2. Brief History of the Art

Certain applications of liquid crystal devices require the incorporation of two or more rectangular optical elements in their fabrication. One example of such a device is a double super twist cell which consists of an active LCD cell and a compensating LCD cell. Another example of such a device is a liquid crystal display shutter which requires the use of two π-cells, and, in some applications, a third anti-reflection sheet of glass. In the case of the liquid crystal shutter, the shutter is often used in a color display which includes a CRT raster device, another element forming the optical system.

In the above-described applications, it is highly desirable to accurately register the optical elements relative to one another using an inexpensive procedure suitable for high volume manufacturing. Contemporary optical system solutions are inadequate in this context. For example, in one common type of solution, a dismantlable mold is used during manufacture to place each optical element in its appropriate relative position. An optically based gel or epoxy, in its pre-cured state, is then poured over a single element before the next element is overlaid. The entire assembly is then cured. After each operation, the optical assembly must be removed and any extraneous material must be removed. There is also extraneous cured material which must be removed from the molding fixture after each cure cycle making this process slow, expensive and poorly suited for high volume manufacturing.

In another equally inadequate contemporary solution, a shutter is mounted in position in the display assembly and the CRT is normally mounted separately, leaving an air space between the CRT and shutter. Because there is no form of enclosure surrounding the system, dust rapidly settles on the optical elements causing a degradation in optical coupling efficiency and a loss of light transmitted through the optical assembly.

SUMMARY OF THE INVENTION

The present invention provides a simple and manufacturable means for containing all of the optical elements in a single package while providing for accurate registration of the elements relative to one another. In a first embodiment, a pair of complementary molded plastic frames are used to fix the optical elements and to provide a precise means for aligning each element relative to the other elements. A first component of the pair is a shutter frame which is molded with apertures and guides similar in format to a "35 mm slide" frame. The shutter frame typically holds two pi-cells and an anti-reflection sheet of glass. A second component of the pair is a CRT frame which is molded and configured to mate with the shutter frame at one end and mate with the curvature of the CRT face at the other end. To facilitate connection to the CRT, plastic "washers" are molded as part of the CRT frame and are operative to mate with the lugs typically found on the CRT band.

The frames are designed to provide a sealed "air-tight" package that prevents dust from settling on the optical elements, as well as providing a convenient configuration for shipping and handling. Special ports can be designed into the frame that enable the injection of an optically transparent gel or epoxy between each optical element thus providing greater optical coupling between the elements and a more rigid optical system. In this embodiment, the injected material is then cured and the frame serves as a permanently attached molding fixture for the entire optical system.

A substantial advantage of the present invention, in addition to accurately registering the optical elements, is that the frame provides a mechanical means for containing the bonding fluid within a fixed volume. When using an injected gel or epoxy, containment becomes necessary to prevent the liquid from flowing in unwanted areas (ie., over the optical elements). In the embodiment wherein air gaps are left between the elements, the frame contains the air and prevents outside lint, toner and other contaminants from settling on the optical surfaces and thereby degrading image quality over time.

The present invention also enables the use of a wider range of gels and epoxies for bonding than would otherwise be possible. Additionally, without a covering, the gels or epoxies are exposed to moisture and other oxidizing ambient materials. This can lead to flaking and other degradation of the bonding material, including yellowing. The use of a frame restricts the amount of bonding material, during and after cure, exposed to the atmosphere. The ports can then be blocked to provide a complete hermetic seal of the interior gel encased volumes.

IN THE DRAWINGS

DETAILED DESCRIPTION OF THE PREFERRED EMBODIMENT

Figure 1:
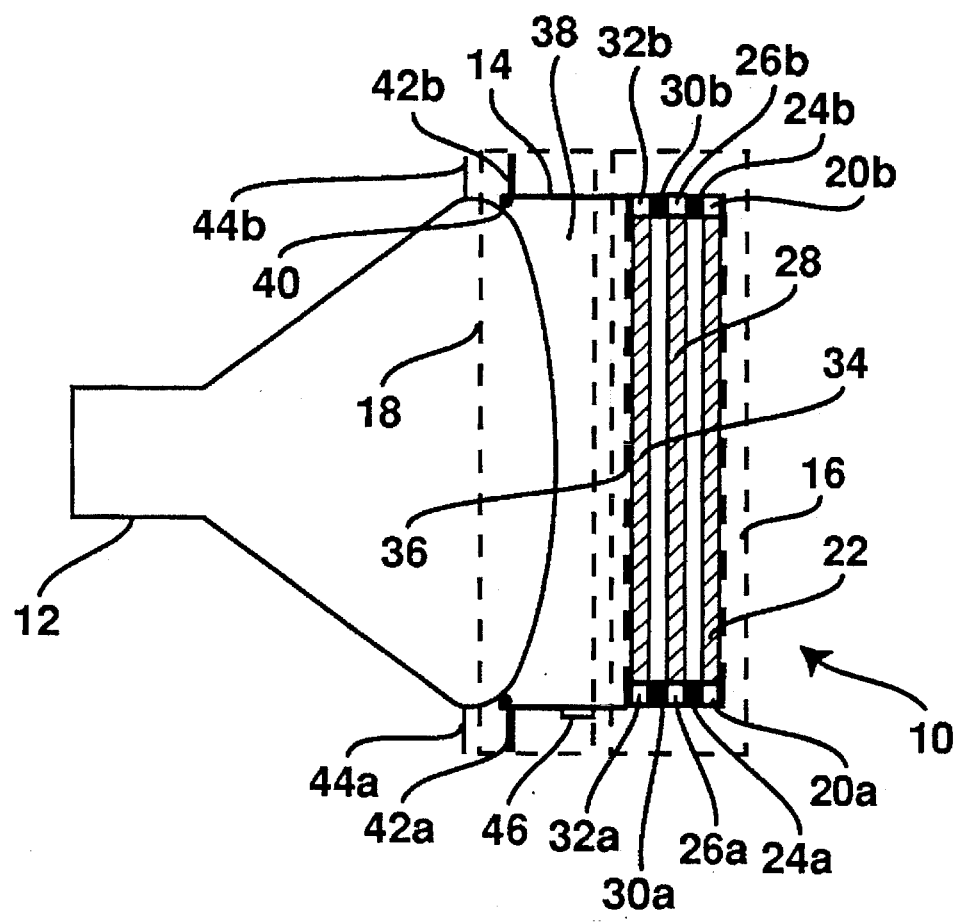
FIG. 1 is a cross-sectional view of the present invention illustrating the integrated shutter-CRT frame embodiment and its interrelationship with the CRT.

Referring now to FIG. 1, shown is a cross-sectional view of one embodiment of the present invention, illustrating a single integrated frame 10 and its interrelationship with a CRT 12. Frame 10 is normally molded from plastic or a like material and is configured at one end to conform to the outer surface of the face of CRT 12. As will be described in detail below, the opposite end of frame 10 is designed with characteristics similar to those of a 35 mm slide frame. This enables the frame to properly fix the optical elements of the system, ie., the LCD panels and anti-reflection coated glass, into their respective operational positions and to maintain accurate relative registration between the elements.

As shown in the figure, frame 10 substantially comprises an integrated body 14 including a registration portion 16, for mounting and registering the optical elements of the system at a first end of body 14, and mounting portion 18, for coupling the elements to CRT 12 at a second end of body 14. Although not shown by the view of FIG. 1, both the front viewing portion and rear of the framed LCD assembly are exposed in a manner permitting the image generated by the CRT to pass unattenuated to a viewer. In this embodiment, each optical element is separated only by air. Thus there is an approximate 4% loss of light generated at each element-air interface in the optical path.

As described above, registration portion 16 is configured in a manner similar to a 35 mm slide frame and includes "slots", each of which is adapted to accept a single optical element. Thus, as shown in FIG. 1, a first complementary slot pair 20a–20b is integrally molded into body 14 of frame 10 and functions, in this embodiment, to fix an anti-reflection coated sheet of glass 22 in a predetermined position within the optical system. The dimensions of slots 20a–20b are determined in accordance with the dimensions of the outer surface of glass 22, typically in the order of approximately 140×200×1.5 min. Two pairs of alignment support pins 24a–24b and 24c–24d (not shown in FIG. 1) are included to more accurately register and secure glass 22 in its correct operational position within the optical system. In the present embodiment, pins 24a–24d are integrally molded into body 14 of frame 10 and are symmetrically disposed about the body to provide the requisite support. Of course, the pins could be separately affixed to body 14 during the manufacturing process. Additionally, any number of pins or other alignment devices could be used in any configuration that properly maintains the requisite registration between the optical elements of the system.

A second complementary slot pair 26a–26b is integrally molded into body 14 of frame 10 and functions, in this embodiment, to fix a first π-cell 28 in a predetermined position within the optical system. The dimensions of slots 26a–26b are determined in accordance with the dimensions of the outer surface of π-cell 28, typically in the order of 140×200×1.1 mm. Two pairs of alignment pins 30a–30b and 30c–30d (not shown in FIG. 1) are included to more accurately register and secure π-cell 28 in its correct operational position within the optical system. In the present embodiment, pins 30a–30d are integrally molded into body 14 of frame 10 and are symmetrically disposed about the body to provide the requisite support.

A third complementary slot pair 32a–32b is integrally molded into body 14 of frame 10 and functions, in this embodiment, to fix a second π-cell 34 in a predetermined position within the optical system. The dimensions of slots 32a–32b are determined in accordance with the dimensions of the outer surface of π-cell 34, typically in the order of 140×200×1.1 mm. Although alignment pins similar to those as described above in relation to glass 22 and π-cell 28 could be included on both sides of π-cell 34, in the present embodiment, body 14 of frame 10 is molded to provide a border support 36 which provides for proper registration and support of π-cell 34. Border 36 surrounds the perimeter of π-cell 34 and effectively separates registration portion 16 from mounting portion 18. Of course, border 36 is configured such that it does not obstruct any image transmissions through the optical system.

Mounting portion 18 extends a predetermined distance from border 36 and defines a cavity 38 which, in the present embodiment, is filled with air. A gasket 40, normally made of rubber, is coupled to body 14 of frame 10 around the outer periphery of mounting portion 18. Gasket 40 serves as an interface between frame 10 and CRT 12 and enables the frame to achieve a substantially air tight seal when mounted against the glass of the CRT. In this configuration, all optical elements (with the exception of the surface of anti-reflection coated glass 22 that is exposed to the viewer) are self-contained with no air flow and, therefore, little opportunity for dust to collect on the surfaces of the elements. An air breather vent 46 is provided through the side of mounting portion 18 allowing passage between cavity 38 and the environment external to the optical system. Vent 46 is necessary to allow air and moisture to breath into the air-filled cavity and to inhibit dust from settling onto the optical surfaces.

To facilitate mounting frame 10 to the face of CRT 12, a plurality of mating plates or washers 42a–42d (42c and 42d not shown in FIG. 1) are integrally formed in body 14 of the frame at the distal end of mounting portion 18. Washers 42a–42d extend substantially perpendicularly outward a predetermined distance from body 14 and are configured to mate with corresponding lugs 44a–44d which are normally clamped to the perimeter of the faceplate of the CRT. These washers provide a direct means for registering the frame to the CRT faceplate with millimeter or better precision. Additionally, the frame could be even more readily aligned with the bezel on a computer monitor by simply placing pins or some other registration protrusions on the distal surface of portion 18 and matching indentations on the CRT bezel surface. These characteristics would enable the frame to provide an effective and manufacturable means for registering all of the optical elements accurately in a single integrated subsystem without requiring special alignment adjustments during production.

Figure 2:
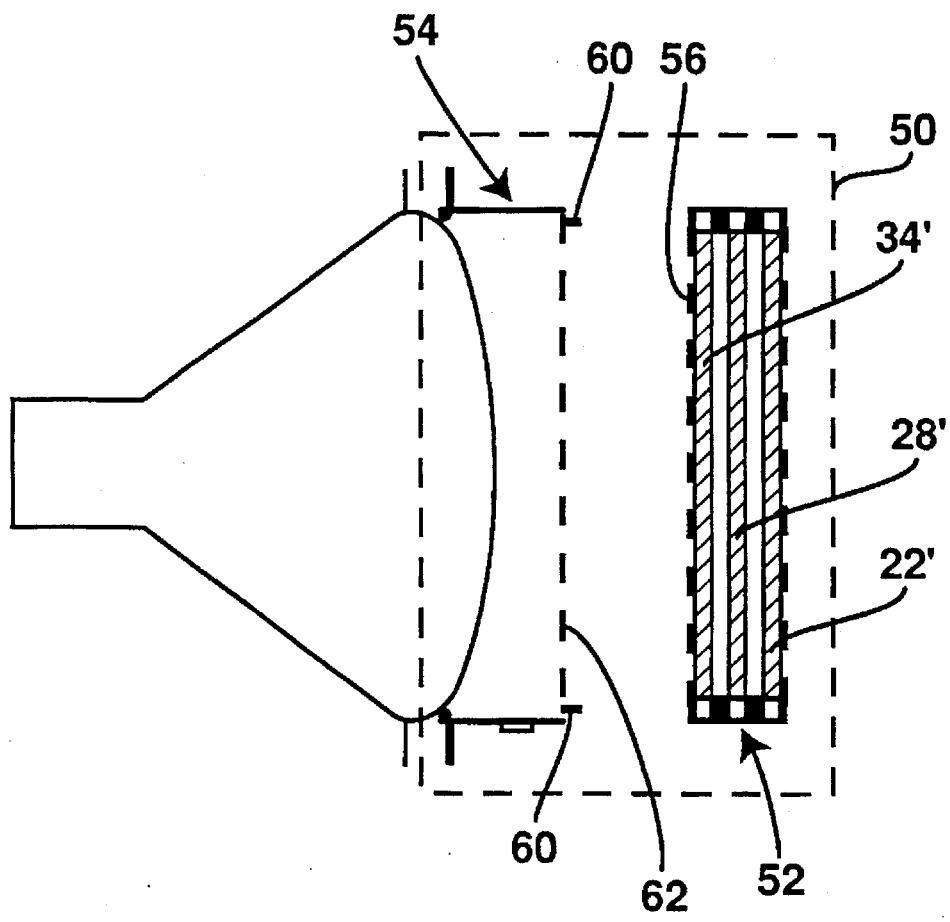
FIG. 2 is a cross-sectional view of the present invention illustrating the two-piece frame embodiment, including the shutter frame and CRT frame, and their interrelationship with the CRT.

Referring now to FIG. 2, shown is a cross-sectional view of a two-piece frame assembly 50 in accordance with the preferred embodiment of the present invention. Assembly 50 is substantially similar to frame 10 described in detail above except that, in contrast to being a single integrated unit like frame 10, assembly 50 comprises two separate units, a registration unit 52 and a mounting unit 54. In relation to frame 10, registration unit 52 is substantially similar to registration portion 16, and mounting unit 54 is substantially similar to mounting portion 18. In this comparative context, frame 10 would simply be separated at border 36, with the appropriate modifications as described below, to produce two-piece assembly 50. Thus the repetitive details of registration unit 52 and mounting unit 54 can be referenced above and will not be hereinafter further described.

As shown in FIG. 2, registration unit 52 secures a piece of anti-reflection coated glass 22', a first π-cell 28' and a second π-cell 34' in predetermined operational positions relative to one another. A coupling border 56 surrounds the outer perimeter of π-cell 34' holding it in position within registration unit 52. Coupling border 56 includes a plurality of receptacles 58 (not shown in FIG. 2) which are configured to mate with a corresponding plurality of alignment pins 60 on mounting unit 54. Alignment pins 60 extend perpendicularly outward from a connecting border 62 on the outer surface of mounting unit 54 and provide proper registration between the mounting unit and the registration unit when mated with receptacles 58. Although any number of pins capable of affecting proper registration could be used, in the preferred embodiment, four symmetrically distributed pins are used to mate with four complementary symmetrically distributed receptacles.

When registration unit 52 and mounting unit 54 are coupled together as described above, assembly 50 is substantially identical in configuration and operation to frame 10 of FIG. 1. However, the two-piece construction of assembly 50 allows the optical elements of the system to be assembled in their own independent frame. This provides for greater ease of handling during the manufacture of a liquid crystal shutter or like device, as well as providing superior cost savings in volume shipping of the shutter.

Figure 3:
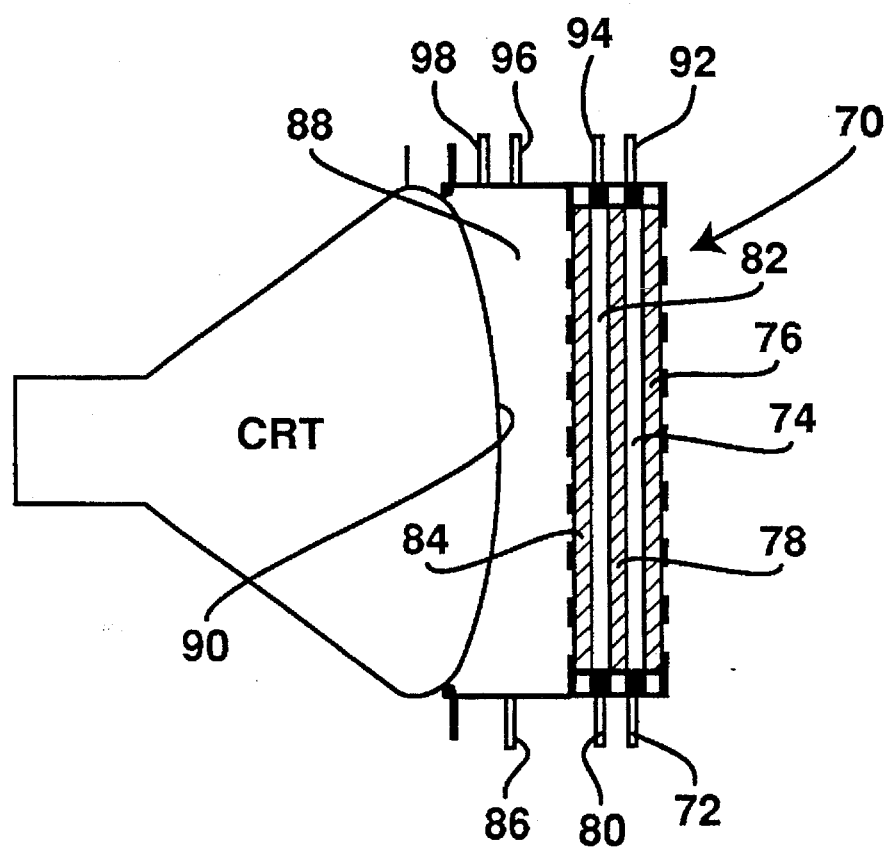
FIG. 3 is a cross-sectional view of the present invention illustrating the integrated shutter-CRT frame embodiment including injection ports and air vents.
Figure 4:
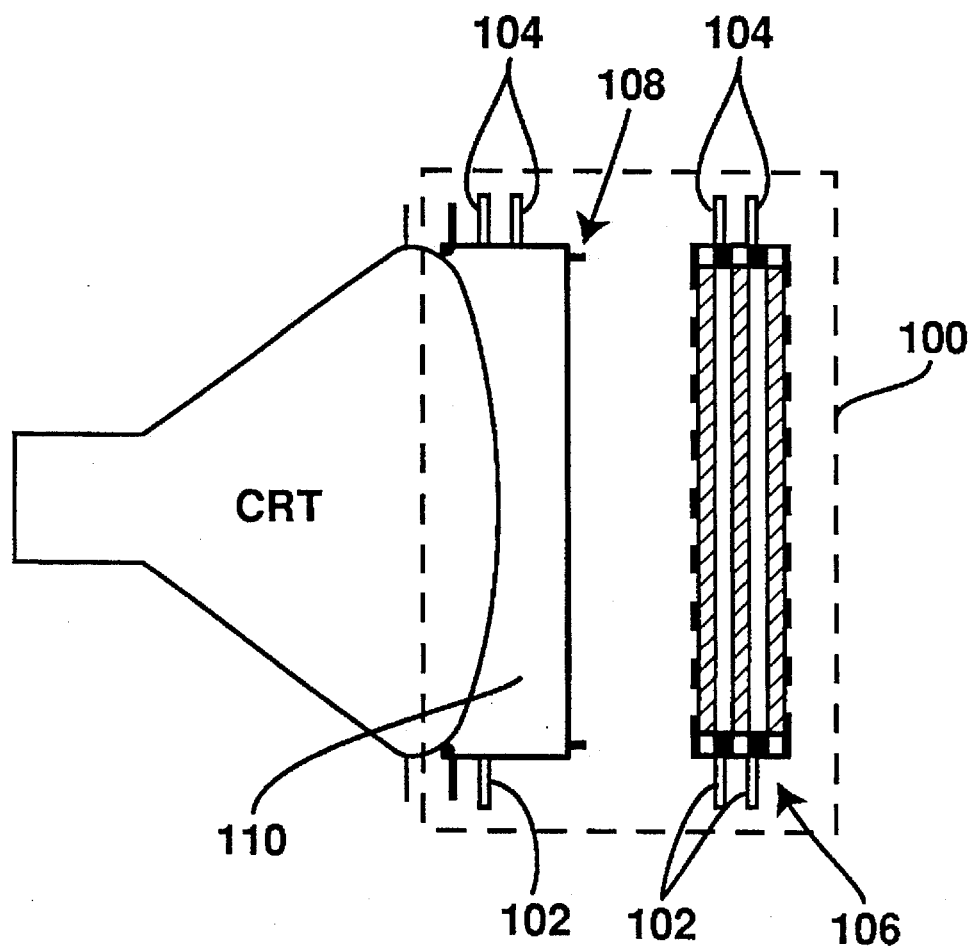
FIG. 4 is a cross-sectional view of the present invention illustrating the two-piece frame embodiment including injection ports and air vents.

FIGS. 3 and 4 illustrate further alternative embodiments of the present invention for use in applications in which light loss must be kept to an absolute minimum. In these applications, it is important to provide an optical coupling material between the various optical elements of the display system. The optical coupling material reduces light loss, internal reflections and image distortion, and normally comprises a curable epoxy or gel which provides an appropriate index of refraction for the system.

FIG. 3 is a cross-sectional view of one embodiment of the present invention illustrating a single integrated frame 70 adapted for use with optically transparent gel or epoxy. Frame 70 is substantially identical to frame 10 described in relation to FIG. 1 above except that a plurality of injection ports and vent ports are included on frame 70. The ports are designed as an integral part of the frame casting and are molded at predetermined positions about the frame. As shown in FIG. 3, a first injection port 72 is disposed through frame 70 in a position which allows external access to a first air gap 74 between a sheet of anti-reflection coated glass 76 and a first π-cell 78. A second injection port 80 is disposed through frame 70 in a position which allows external access to a second air gap 82 between first π-cell 78 and a second π-cell 84. A third injection port 86 is disposed through frame 70 in a position which allows external access to a third air gap 88 between second π-cell 84 and a CRT screen 90.

A plurality of vent ports are also integrally formed with frame 70 at predetermined positions about the frame in complimentary positions relative to the above-described injection ports. A first vent port 92 is disposed through frame 70 in a position which allows external access to gap 74, similar to injection port 72. Likewise, a second vent port 94 is disposed through frame 70 in a position which allows external access to gap 82, similar to second injection port 80. And, a third vent port 96 and fourth vent port 98 are disposed through frame 70 in positions which allow external access to gap 88, similar to injection port 86.

During manufacture, the injection ports provide a means for injecting the optically transparent curable gel or epoxy into the air gaps between each of the optical elements. The complimentary vent ports, normally on the opposite side of frame 70 relative to the injection ports, allow the air in the air gaps being filled with the gel to escape during the injection process. After injection, the injection ports and vent ports are sealed to prevent leakage of the uncured epoxy or gel, and the entire assembly is exposed to heat for a predetermined curing time. Once the epoxy or gel hardens, the portions of the ports protruding from the frame surface can be trimmed if desired. The manufacturing process can be adapted to enable all of the optical elements to be mounted and the epoxy injected into all of the air gaps simultaneously, and cured together. Alternatively, it may be advantageous, depending upon component costs and yields, to load, inject and cure one element at a time.

FIG. 4 shows a cross-sectional view of an alternative embodiment of the present invention illustrating a two-piece frame assembly 100 adapted for use with optically transparent gel or epoxy. Assembly 100 is substantially identical to assembly 50 described above in relation to FIG. 2 except that a plurality of injection ports 102 and vent ports 104 are included on frame 100. Since the details of the configuration and operation of assembly 100 have been described in detail above with reference to FIGS. 2 and 3, no further detailed description of the common elements and functions will be given. However, note that in the embodiment of FIG. 4, it is necessary to secure registration unit 106 to mounting unit 108 prior to injecting gel into air gap 110.

Whereas the preferred embodiment of the present invention has been described above, it is contemplated that other alternatives and modifications may become apparent to those skilled in the art after having read the above disclosure. It is therefore intended that the appended claims be interpreted as covering all such alterations and modifications as fall within the true spirit and scope of the invention.

What is claimed is:

1. A frame device for an optical system, comprising:

an integrated body having a registration portion and a mounting portion;

the registration portion of the integrated body having a plurality of holders, each holder for receiving and holding a respective one of a plurality of optical elements such that the plurality of optical elements are registered in predetermined positions relative to one another in the registration portion and such that the plurality of optical elements are separated from one another;

the mounting portion of the integrated body configured to couple the integrated body to a display device such that the plurality of optical elements are aligned relative to the display device so as to form an optical path from the display device through the plurality of optical elements, the mounting portion further comprising a gasket for providing a sealed interface between the integrated body and the display device.

2. The frame device of claim 1, wherein the plurality of holders comprise slots molded in the registration portion for receiving and holding the plurality of optical elements in the registration portion of the integrated body.

3. The frame device of claim 1, wherein the plurality of holders comprise spacers for positioning and supporting the plurality of optical elements in the registration portion of the integrated body.

4. The frame device of claim 1, wherein the plurality of holders comprise alignment pins for registering the plurality of optical elements in the registration portion of the integrated body.

5. The frame device of claim 1, wherein the integrated body includes a border support for registering one of the plurality of optical elements in the registration portion, the border support separating the registration portion from the mounting portion.

6. The frame device of claim 1, wherein the plurality of optical elements include a π-cell and anti-reflective glass.

7. The frame device of claim 1, wherein the display device comprises a CRT.

8. The frame device of claim 1, wherein the integrated body comprises plastic.

9. The frame device of claim 1, wherein the registration portion comprises an injection port for enabling a material to be injected into the registration portion between two of the plurality of optical elements; and wherein the registration portion comprises a vent port for allowing air between the two optical elements to escape from the registration portion when the material is injected.

10. The frame device of claim 9, wherein the material is an optically transparent epoxy or gel.

11. A frame device for an optical system, comprising:

an integral registration unit and an integral mounting unit;

the integral registration unit having a plurality of holders, each holder for receiving and holding a respective one of a plurality of optical elements such that the plurality of optical elements are registered in predetermined positions relative to one another in the integral registration unit and such that the plurality of optical elements are separated from one another;

the integral mounting unit configured to couple the integral registration unit to a display device such that the plurality of optical elements are aligned relative to the display device so as to form an optical path from the display device through the plurality of optical elements, the integral mounting unit further comprising a gasket for providing a sealed interface between the integral mounting unit and the display device.

12. The frame device of claim 11, wherein the plurality of holders comprise slots molded in the integral registration unit for receiving and holding the plurality of optical elements in the integral registration unit.

13. The frame device of claim 11, wherein the plurality of holders comprise spacers for positioning and supporting the plurality of optical elements in the integral registration unit.

14. The frame device of claim 11, wherein the plurality of holders comprise alignment pins for registering the plurality of optical elements in the integral registration unit.

15. The frame device of claim 11, wherein the integral registration unit includes a border support for registering one of the plurality of optical elements in the integral registration unit and configured to couple the integral registration unit to the integral mounting unit.

16. The frame device of claim 11, wherein the plurality of optical elements include a $\pi$-cell and anti-reflective glass.

17. The frame device of claim 11, wherein the display device comprises a CRT.

18. The frame device of claim 11, wherein the integral registration unit and the integral mounting unit each comprise plastic.

19. The frame device of claim 11, wherein the integral registration unit comprises receptacles and wherein the integral mounting unit comprises pins for mating with the receptacles in coupling the integral registration unit with the integral mounting unit.

20. The frame device of claim 11, wherein the integral registration unit comprises an injection port for enabling a material to be injected into the integral registration unit between two of the plurality of optical elements; and wherein the integral registration unit comprises a vent port for allowing air between the two optical elements to escape from the integral registration unit when the material is injected.

21. The frame device of claim 20, wherein the material is an optically transparent epoxy or gel.

\* \* \* \* \*